No. 895,523. PATENTED AUG. 11, 1908.
C. P. WETMORE.
ADDING TABULATOR.
APPLICATION FILED AUG. 28, 1905.
7 SHEETS—SHEET 1.

Witnesses:
Wm. Geiger
H. W. Munday

Inventor:
Charles P. Wetmore
By Munday, Evarts & Adcock,
Attorneys

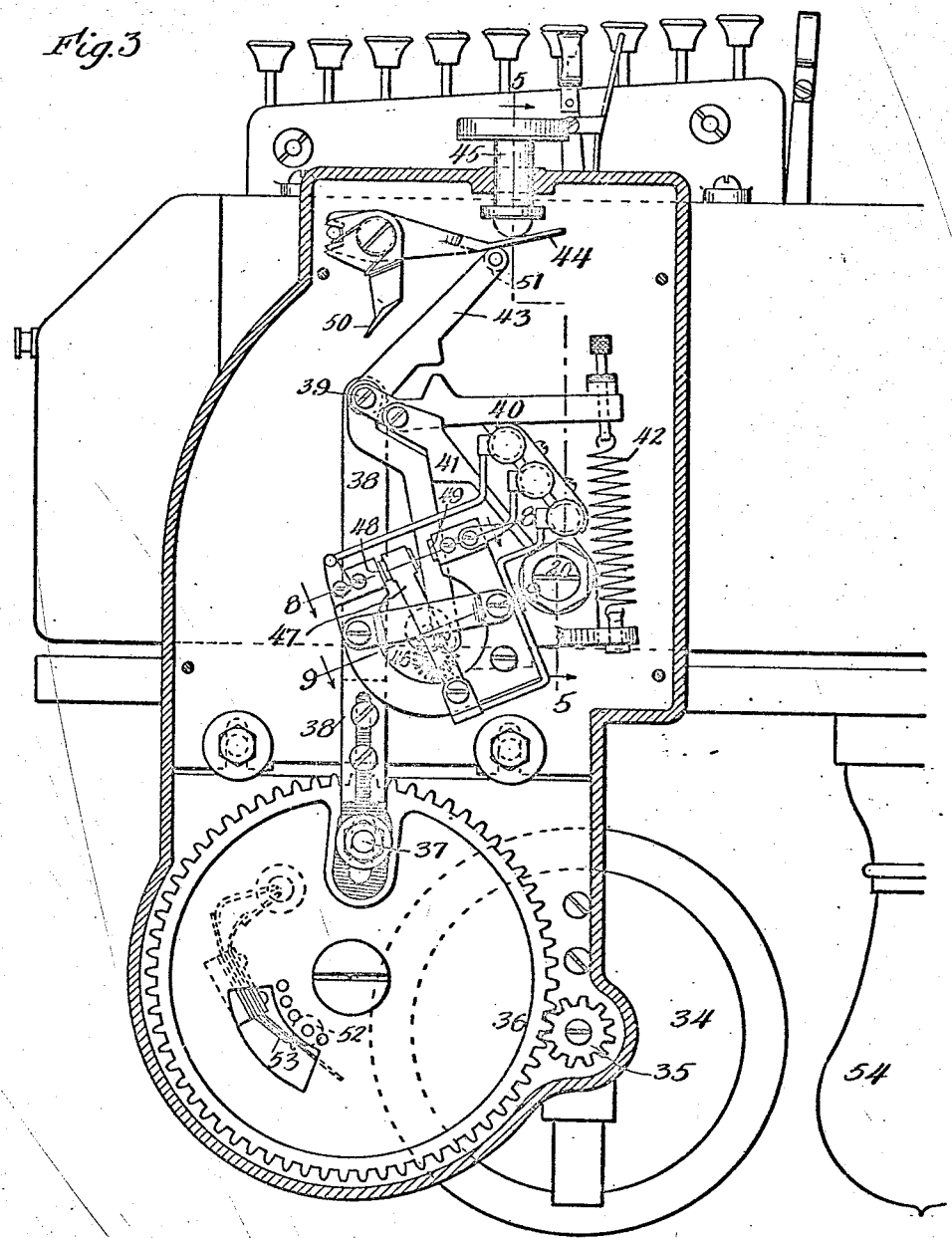

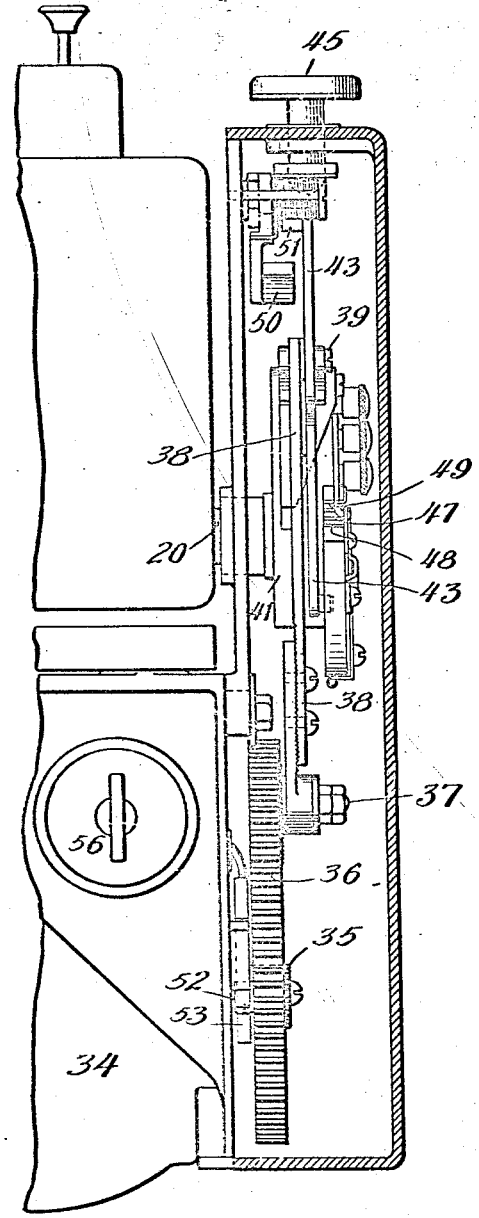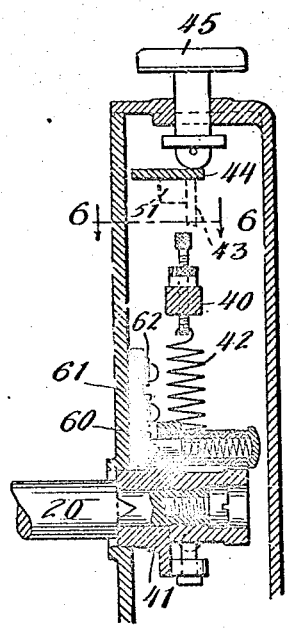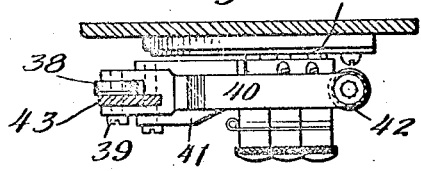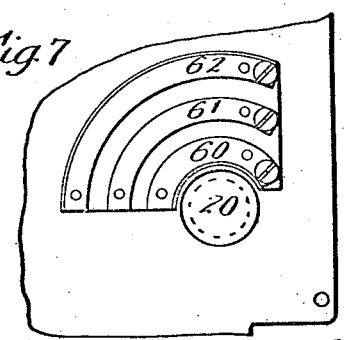

No. 895,523. PATENTED AUG. 11, 1908.
C. P. WETMORE.
ADDING TABULATOR.
APPLICATION FILED AUG. 28, 1905.

7 SHEETS—SHEET 4.

Witnesses
Wm. Geiger

Inventor:
Charles P. Wetmore
By Munday, Evarts & Adcock.
Attorneys

No. 895,523.

C. P. WETMORE.
ADDING TABULATOR.
APPLICATION FILED AUG. 28, 1905.

PATENTED AUG. 11, 1908.

7 SHEETS—SHEET 6.

Witnesses:
Wm. Geiger

Inventor:
Charles P. Wetmore
By Munday, Evarts, Adcock & Clarke
Attorneys

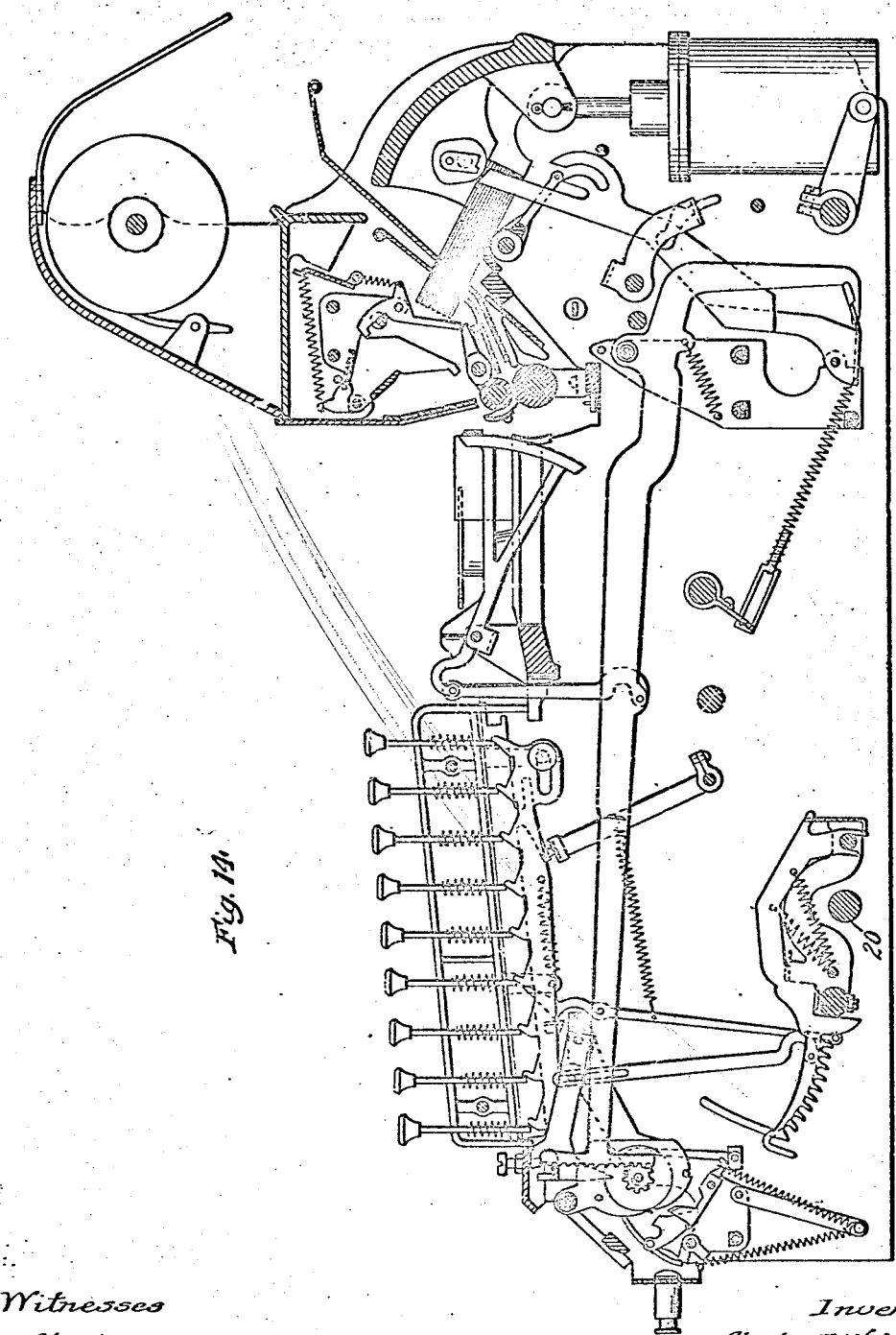

UNITED STATES PATENT OFFICE.

CHARLES P. WETMORE, OF CHICAGO, ILLINOIS, ASSIGNOR TO COMPTOGRAPH COMPANY, OF CHICAGO, ILLINOIS, A CORPORATION OF ILLINOIS.

ADDING-TABULATOR.

No. 895,523.　　　　　Specification of Letters-Patent.　　Patented Aug. 11, 1908.

Application filed August 28, 1905. Serial No. 275,991.

*To all whom it may concern:*

Be it known that I, CHARLES P. WETMORE, a citizen of the United States, residing in Chicago, in the county of Cook and State of Illinois, have invented a new and useful Improvement in Adding-Tabulators, of which the following is a specification.

This invention relates to improvements in adding tabulators. And the invention consists in the novel construction of parts and devices and novel combinations of parts and devices herein shown and described.

Figure 1:
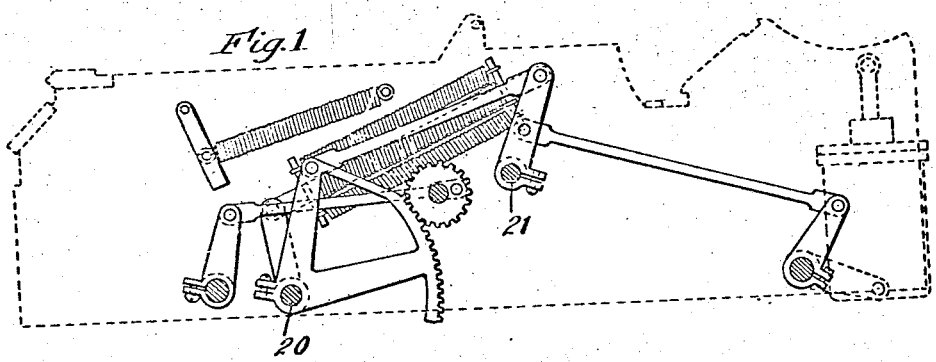
Figure 2:
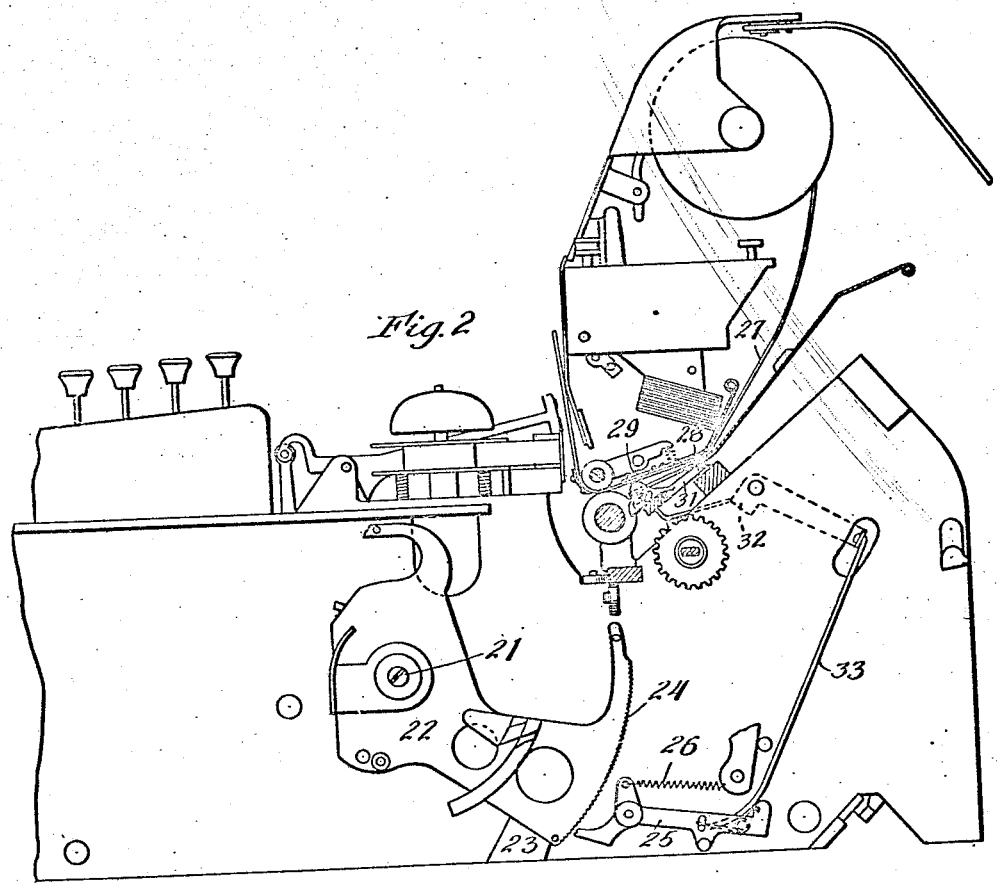
Figure 8:
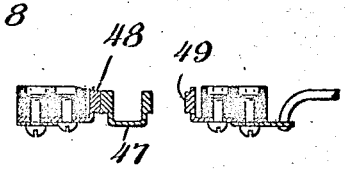
Figure 9:
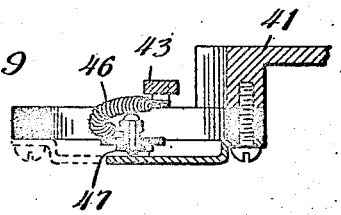
Figure 10:
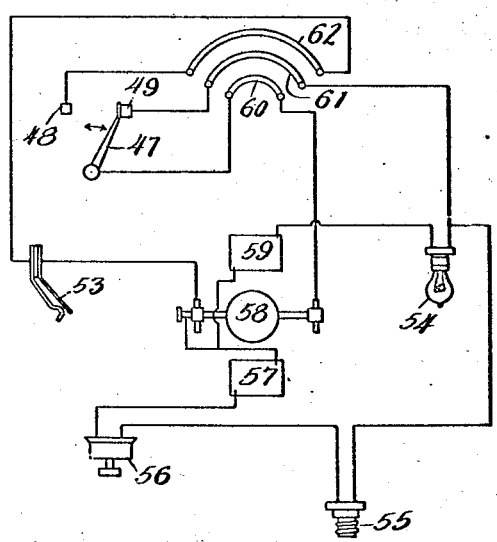
Figure 11:
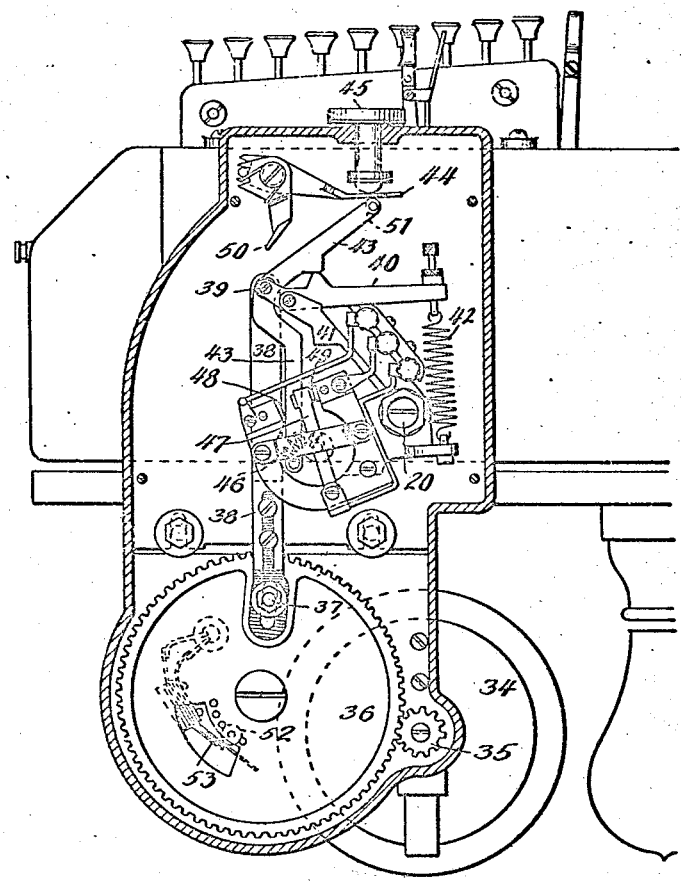
Figure 12:
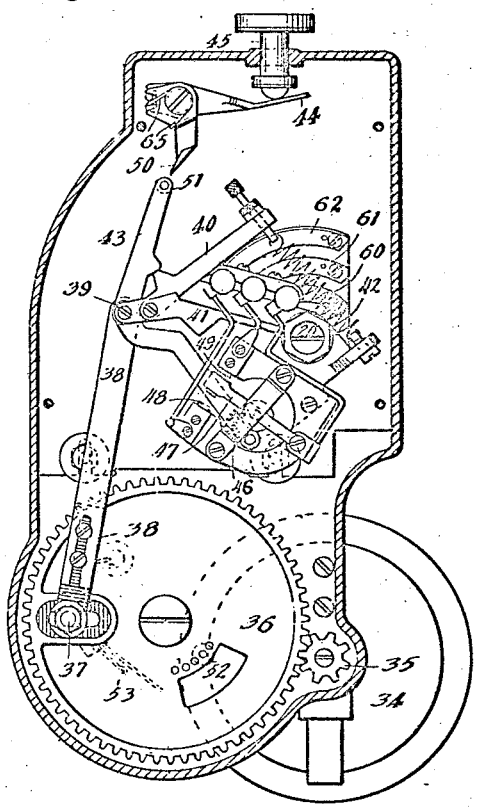
Figure 13:
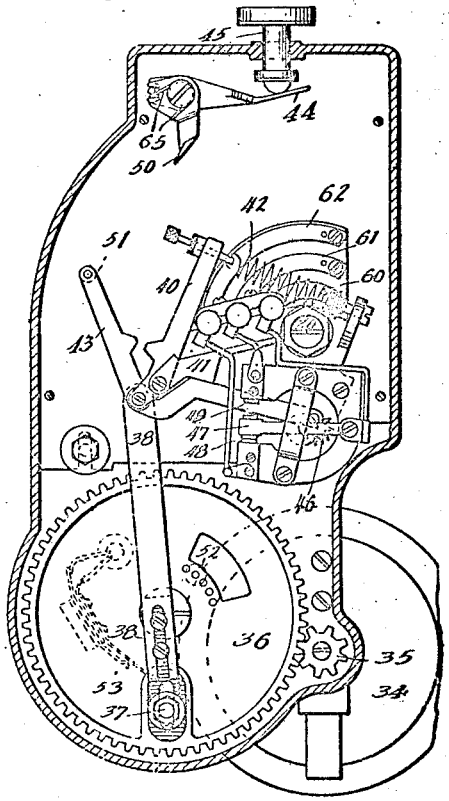

In the accompanying drawings forming a part of this specification, and in which similar figures of reference indicate like parts throughout, Figure 1 is a side elevation of the adding mechanism of the well-known comptograph, the side frame of the machine being shown in dotted lines. Fig. 2 is a side elevation partly in section, and upon a different scale from Fig. 1, showing a portion of the paper feed and printing mechanism of the comptograph. Fig. 3 is a side elevation, partly in section, of the motor and its connection to the comptograph. Fig. 4 is an end elevation of the mechanism shown in Fig. 3. Fig. 5 is a section on line 5—5 of Fig. 3. Fig. 6 a section on line 6—6 of Fig. 5. Fig. 7 a detail of the contact segments. Fig. 8 a section on line 8—8 of Fig. 3. Fig. 9 a section on line 9—9 of Fig. 3. Fig. 10 is a diagram of the electric circuits. Fig. 11 is a view similar to Fig. 3, but showing the parts in the position assumed after the depression of the key 45 in said figure. Fig. 12 is an elevation showing the parts in the position which they occupy after the key 45 has been depressed and the motor has made about one-fourth of its working stroke. Fig. 13 is an elevation showing the same parts with the crank just on the half way point of its stroke, and Fig. 14 is a vertical longitudinal section through the entire machine, reproducing Fig. 13 of the patent to Dorr E. Felt, No. 694,955, herein referred to.

The comptograph is a well known machine largely in use, having a key board consisting of several columns of keys, each column comprising the nine digits of the Arabic numeral system, one being the units column, one the tens column, one the hundreds column, and so forth, to the highest order the machine is capable of handling. To operate the machine, as for example in adding a series of numbers together, one key in each column to correspond to the figures of the number is depressed by the finger of the operator. This sets a mechanism in position, such that when a hand lever is subsequently operated a numeral wheel is rotated through such portion of a complete revolution as will represent the relation of the figure on the key to a full revolution; and at the same time a segment containing printing type on its periphery is swung into position and a type representing the figure on the key touched is presented to a printing line; and when the hand lever, above mentioned, is operated, this type is made to impress itself upon a sheet of paper. The machine does this printing in parallel columns on a broad sheet of paper. The use of the broad sheet of paper instead of a continuous roll or ribbon, although otherwise advantageous, involves the danger that the operator may forget or overlook the fact that the end of the sheet has been reached in the printing of a column, and thus print the number "in the air" instead of on the sheet, and so lose the record of his operations. To avoid this it has been customary to provide the comptograph with means for rendering the adding and printing mechanisms inoperative, and in the preferred construction they are automatically locked by means which may be briefly described as follows: The sheet of paper is made to pass in contact with a slotted surface, and a pivoted finger is made to press against the paper opposite the slot. To prevent the tendency to tear the paper it is usual to employ several fingers. So long as the paper is present, either stationary or feeding along, it keeps the finger or fingers out of the slot or slots; but so soon as the paper passes the finger, the latter enters the slot, and this movement of the finger in so entering the slot causes the machine to be locked so that it can neither add nor print until the sheet is fed back and a new column started, or a new sheet put in place.

It is the purpose of the present invention to provide means for driving the operating lever of a machine of this character by power, so that the operator, instead of being required to operate a lever by hand with sufficient force to perform the several operations mentioned above, may be able to set a source of power in motion at the right moment, by merely touching a key connected to a suitable starting lever, which latter will open a valve, connect a clutch or close a switch, according as the power may be a fluid or vapor or gas engine, a water engine, a revolving power shaft, or an electric motor.

The invention consists in combining with the comptograph or tabulating adding machine, a motor in such manner that when the starting lever is operated, if the sheet of paper is in place, the power will be transmitted from its source to the comptograph mechanism, and the latter will be caused to operate to do the adding and the printing, and if the sheet of paper be not in place to receive the printing properly, such operation of the starting lever will not cause the comptograph to operate. And the invention further consists in bringing about the above conditions by connecting the motor, or a power shaft or an electric motor, by means of a spring or yielding connection to the driven shaft of the comptograph, so that when said driven comptograph shaft is locked, or is otherwise rendered inoperative or offers an unusual resistance, the spring will stretch and this will cause the motor to move the starting lever in such direction as to close the valve, disengage the clutch or open the switch, as the case may be. All of which will be better understood from the following description:

Although, as before stated, any kind of motor may be used, the Comptograph Company, for whom as its employee I made this invention, has preferred to use an electric motor as being the compactest and most easily cared for kind. And said company has had an electrical engineer design and construct a suitable form of motor and connecting mechanism and circuits. This apparatus fully embodies all that I have invented, and being the first physical embodiment of my invention, I shall describe it here, as far as necessary, to enable those skilled in the art to practice the invention. In the said drawings,—referring to Fig. 1,—20 is a rock shaft being the main actuator of the comptograph to which power is applied to operate the machine after the keys have been set. This main actuator is connected by suitable levers &c., with the shaft 21. On the shaft 21 is mounted a cam 22 resting on the stop 23, and having a toothed segment 24 in position to be engaged by the pivoted dog 25, said dog being set toward the segment by the spring 26. The sheet of paper is shown at 27 resting beneath the guide plate 28, in which plate is a slot 29. 30 is a finger resting up against the sheet of paper opposite the slot 29, and held from entering said slot by the presence of the paper. This finger is mounted, as will be seen, on a pivoted bar 31; and resting up against said bar 31 is a lever 32, the outer end of which by the connecting rod 33, is connected with the dog 25. It will be seen that when the paper passes out from between the finger and the slotted plate 28, the tension of the spring 26 being no longer restrained, will throw the dog into engagement with the segment 24 of the cam 22, thus locking shaft 21 and shaft 20 and consequently the operating rock shaft of the comptograph. The machine may be unlocked by turning back the feed roll to bring the sheet of paper back to its unlocked position, or by inserting a new sheet of paper. All of this more fully described in Patent No. 694,955 of March 11, 1902 to Dorr E. Felt.

Referring to Fig. 3 and the subsequent figures: 34 indicates an electric motor, upon the shaft of which is the pinion 35, meshing with the gear 36 carrying the wrist pin 37, to which latter is connected the pitman 38, pivoted at 39 to the short arm of a lever 40, fulcrumed in a bracket 41, said bracket being rigidly connected to the main actuating shaft 20 of the comptograph. When the gear wheel 36 makes a complete revolution it will rock the main actuating shaft 20 by means of the bracket 41, because the lever 40 has its longer arm connected by a spring 42 to said bracket, and this spring is adjusted to be strong enough to transmit the power of the motor to the shaft 20 and thus operate the comptograph, under ordinary circumstances; but if the comptograph shall be locked, then the strength of the spring 42 will be overcome by the motor and the lever 40 will move. When the main actuating shaft 20 is locked by means of the locking device of the comptograph, it is of course, impossible for the pitman 38 to cause it to move either directly through the bracket 41 or indirectly through the lever 40 pivoted on said bracket, because the long end of the lever 40 is connected to the bracket itself by means of the spring 42. Nothing could rotate the shaft 20 when it is locked. The spring lever is provided in order that the pitman may move sufficiently to cut off power from the motor, even when the shaft 20 is locked. The pitman is permitted to move because its upper end is attached at the pivot 39 to the short end of the lever 40, and the lever 40 is pivoted on the bracket 41 which has an arm projecting from the shaft 20. On the other hand, when the shaft 20 is not locked and the motor reciprocates the pitman 38 at such a time, the latter through the pivot 39 oscillates the bracket arm 41 because the pitman is connected to said bracket arm 41 through the short arm of the lever 40, and further because the spring 42 connected from the long arm of the lever 40 to a portion of the bracket 41 is strong enough so that it will not permit the lever 40 to swing on its own fulcrum, so that in effect at this time, the pitman is rigidly connected to the bracket 41. Thus it will be seen that at times there is between the pitman 38 and the bracket 41 an unyielding connection, and at other times a yielding connection, the unyielding connection existing when the shaft 20 is not locked, and the yielding connection existing when said shaft 20 is locked. Pivoted to the same pivot 39 is the lever 43, the upper arm of which stands beneath the pivoted plate 44, which is held by the spring 65 in position to be depressed by the starting key 45. The lower end of the lever 43 is connected by a spring connection 46 to the switch lever 47 set to oscillate between the two contact points 48, 49, to throw the power on and off from the motor through the connections indicated in the diagram at Fig. 10.

50 is the swinging cam in the path of the roller 51 that is carried at the upper arm of the lever 43. When the gear wheel 36 is rotated and the bracket 41 pulled down through its arc of movement to rock shaft 20, this roller 51 strikes the under surface of the swinging cam 50 and pushes it aside on the down stroke of the pitman 38; but on the upstroke of the pitman the roller 51 engages the upper surface of the cam 50, and as the cam cannot swing in that direction, the upper arm of the lever 43 is held while the bracket 41 continues to move, and this causes the lever 43 to swing, thus reversing the switch 47 and bringing it into contact again with the contact 48 as before, so that at each revolution of the gear wheel 36 brought about by depressing the starting key 45 the switch is brought into contact with the contact point 49, the rock shaft 20 is swung through its complete arc, and the switch is brought back again to its contact 48, and the mechanism is in position to start again.

In order that the operation may more fully appear, we will once more follow it through, beginning with a movement of the key 45. In Fig. 3 the mechanism is shown in the completed position; that is to say, at rest, and ready to begin an operation. Now if the key 45 be pushed down, the pivot plate 44 will thereby be depressed, and bearing against the roller 51, this downward movement will be imparted to the upper arm of the lever 43, whose fulcrum is at 39 on the end of the pitman 38. The pitman affords a resistance to a downward movement of the fulcrum 39, and consequently the lever 43 swings on the fulcrum and brings a tension upon the spring connection 46, one end of the spring being connected to the lever 43 and the other end being connected to the switch 47. The movement of this spring throws the switch in the opposite direction from the movement of the lever and causes the switch to make contact with the point 49 and remain in such contact. And this puts the current upon the motor, causing the latter to revolve. And in course of the revolution, the roller 51 on the lever 43 comes in contact with the cam 50 which restores the lever to its original position, reversing the switch again to cut the motor out. The upper side of the part 50 acts as the cam for this purpose. The plate 44 is held in normal position (as in Fig. 3) by the spring shown at the axis of the plate. This spring also may serve to keep the key 45 normally elevated. This is the ordinary and normal action. But if the comptograph shall happen to be locked at the time when the starting key is operated, and the switch thereby reversed, then in that case, as the shaft 20 cannot be rotated the power of the motor is exerted through the pitman 38 to pull down on the short end of the lever 40 overcoming the tension of the spring 42. This movement of the lever 40 produces a movement of the lever 43 because the point of attachment of the pitman 38 and lever 40 is the fulcrum 39 of the lever 43. And this movement of the fulcrum 39 throws over the switch 47 into the other contact position, thus cutting off the power. From which it will be seen that any attempt to apply the power of the motor when the comptograph is locked results immediately in its being automatically cut off again.

The gear wheel 36 carries a roller 52, which engages a switch 53 to hold the latter closed when said gear wheel is in position of rest, and to break the circuit at this point when the gear wheel is rotated.

54 is an electric incandescent light in the circuit for the purposes of resistance. In the diagram at Fig. 10, 55 is the plug for connecting the circuit to the prime source of energy; 56 is a common snap switch for cutting the circuit in and out; 57 the series field of the motor; 58 is the armature of the motor; 59 is the shunt field of the motor; 53 is the short circuiting switch; 47 is the motor starting switch between contacts 48, 49, and 60, 61, 62 are three brush contacts to permit the maintenance of the circuit while the bracket carrying the switch 47 swings through its arc.

The course of the current,—referring to the diagram Fig. 10—, is as follows: From the attachment plug 55 to the switch 56, thence to the series field 57 thence, dividing, one part passes through the shunt field 59, thence to and through the lamp 54; the other part of the current from the point of division passes through the armature to the brush contact 60, through the switch bar 47 to the contact 49, thence through the brush contact 61 to join the other part and from the junction to the plug 55.

When the starting switch 47 is in contact with the other point —48— and the short circuiting switch 53 is closed by the operation of the gear 36, the motor is so energized as to act as a brake to overcome whatever momentum may exist in the moving parts.

In view of the inventions claimed in the co-pending application of Harold R. Wellman, Serial No. 280,741, filed Sept. 30, 1905, for improvements in adding machine attachments, I disclaim the following combinations of elements, namely: In a calculating machine, the combination with the driving shaft thereof, of a crank arm connected to said shaft, a motor, a gear wheel driven by said motor, a rod connecting said gear wheel and crank arm, a switch carried by said crank arm for cutting said motor in or out of circuit, and a key accessible to the operator of the machine for closing said switch; in a calculating machine, the combination with the driving shaft thereof, of a crank arm secured on said shaft, a motor, a switch carried by said crank arm for cutting said motor in or out of circuit, an operator's key for closing said switch, and means driven by the motor for operating said crank arm; in a calculating machine, the combination with the driving shaft thereof, of a crank arm connected to said shaft, a gear wheel, a rod connecting said gear wheel and crank arm, a motor for driving said gear wheel, a switch arm carried by said crank arm, a switch member, pivoted to said connecting rod and adapted to operate said switch arm to open or close the motor circuit, a finger key, a tripping lever actuated by said key to engage the switch member and thereby close the switch, whereby said gear wheel makes one revolution for a momentary depressing of said key, and a restoring lever in the path of movement of the switch member and adapted to operate the same on the return stroke of the connecting rod to open the switch; the combination with a driving shaft of a calculating machine, of a crank arm secured on said shaft, a motor, means driven by the motor for rocking said crank arm, said means being adjustable to compensate for currents of different voltages, a switch mounted on the crank arm for cutting said motor in or out of circuit, a finger key for closing said switch, and a restoring lever adapted to open the switch on the return stroke of the crank arm; the combination with a calculating machine provided with registering and recording mechanism, a shaft for driving the same and means for locking the shaft, of a crank arm secured on said shaft, a lever pivoted on said arm, a gear wheel, a rod connecting said gear wheel and lever, a motor for driving the gear wheel, a switch for cutting the motor in or out of circuit, and a spring connecting the lever and crank arm, the tension of said spring preventing the movement of said lever on the arm during the normal operation of the shaft, but said lever being responsive to the pull of said rod to open the switch when said shaft is locked; the combination with a calculating machine, provided with a driving shaft and means for locking the same, of a motor, an arm on said shaft, a lever pivoted to said arm, a yielding connection between the free end of said lever and arm, a connection between said lever and motor for operating the arm, a switch for closing the circuit of the motor, said switch being arranged to be operated by the yielding of said lever when the shaft is locked; the combination with a driving shaft of a calculating machine, a motor, connection between said motor and said driving shaft, a pair of contacts, a switch arm for said contacts, the movement of which in one direction closes a circuit to rotate the motor armature and the movement in the reverse direction closes a circuit which acts to overcome the momentum of the parts; the combination with the driving shaft of a calculating machine, of a crank arm secured on said shaft, a lever pivoted at the upper end of said arm, a coiled spring connecting one end of said lever with the lower end of said arm, a gear wheel, a rod connecting said gear wheel and said lever, a motor for driving said gear wheel, a pair of opposing contacts and a switch arm carried by said crank arm for controlling the circuit of the motor, a switch member pivoted to said rod for operating the switch arm, a lever for tripping said switch member, a finger key for operating said tripping lever to close the circuit, and a restoring lever in the path of movement of said switch member and adapted to operate the same to open the circuit during the return stroke of the rod; the combination with the driving shaft of a calculating machine, of an electric motor for operating said shaft, and a switch carried by said shaft for controlling the closing and opening of the motor circuit.

I claim:

1. The combination of the self-locking tabulating adding machine, having adding and printing mechanism and means for locking the same, with a motor, a reversible starting lever and means for reversing the starting lever automatically when the adding machine is locked as aforesaid, substantially as specified.

2. The combination of an adding machine, having adding and printing mechanism, means controlled by the paper for locking and unlocking the adding and printing mechanism of such machine, and a motor for actuating such machine, the action of said motor being controlled by the paper, substantially as specified.

3. The combination with the self-locking adding machine having a power shaft, a power-driven motor, a yielding connection between the said power shaft and said motor, a starting lever, and means for imparting the motion which takes place during the yield of said connection to the starting lever to cut off the power, substantially as specified.

4. A tabulating machine and a motor for operating the same, both the machine and the motor being provided with means controlled by the paper for rendering them inoperative when the bottom of the sheet upon which the tabulating is being done is reached, substantially as specified.

5. A tabulating machine and a motor for operating the same both the machine and the motor being provided with automatic means for rendering them inoperative when the bottom of the sheet upon which the tabulating is being done is reached, substantially as specified.

6. The combination with an intermittently driven shaft, of a motor, a crank driven thereby, and a yielding connection between said crank and shaft, whereby the driving operation of the crank is not transmitted to the shaft when said shaft is locked.

7. The combination with an intermittently driven shaft, of a motor, a crank driven thereby, a crank carried by said driven shaft, and a yielding connection between said cranks, whereby the driving operation of said motor driven crank is not transmitted to said other crank when the driven shaft is locked.

8. The combination with a calculating machine, provided with a driving shaft and means for locking the same of a motor for driving said shaft and means for rendering said motor inoperative and for resetting the motor parts to their normal position when said shaft is locked.

9. The combination with a calculating machine provided with a driving shaft and means for locking the same, of a motor, a yielding connection between said motor and shaft, a motor circuit, and a switch controlling the circuit of the motor adapted to be opened by the yielding of said connection when the shaft is locked.

10. The combination with a calculating machine provided with a driving shaft and means for locking the same, of a motor for operating said shaft, a motor circuit, a switch for closing the circuit of said motor, and a yielding connection between said motor and shaft adapted to yield and thus render the motor inoperative to drive the shaft when said shaft is locked.

11. The combination with a calculating machine provided with a driving shaft and means for locking the same, of a motor for operating said shaft, a motor circuit, a switch for cutting said motor in or out of circuit, means manually operated to close the switch, means automatically operated to open the same after a complete operation of said shaft, and a yielding connection between said motor and shaft adapted to automatically open said switch when said driving shaft is locked.

12. The combination with a calculating machine provided with a driving shaft and means for locking the same, of a motor, mechanism driven by said motor for actuating said shaft under normal operation of said calculating machine, a motor circuit, a switch for cutting said motor in or out of circuit, and means for automatically opening said switch and returning the motor driven mechanism to its normal position when the driving shaft is locked.

13. In a calculating machine, the combination with the driving shaft of the machine, of a motor circuit and a motor, a wheel driven thereby, means operated by the rotation of said wheel to control the circuit of the motor, and a yielding connection between said wheel and shaft.

14. The combination with a calculating machine provided with a driving shaft and means for locking the same, of a motor, gear connection between said motor and shaft, and means for preventing the operation of said gear when the shaft is locked.

15. In a calculating machine, the combination with a driving shaft and means for locking the same, of a motor, a crank driven thereby, a crank carried by said driving shaft, a yielding connection between said cranks, a motor circuit, and a switch controlling the circuit of the motor, adapted to be opened by the yielding of said connection when the shaft is locked.

CHARLES P. WETMORE.

Witnesses:
L. J. OTTEN,
H. B. WYETH.